(12) United States Patent
Wang et al.

(10) Patent No.: US 12,213,236 B2
(45) Date of Patent: Jan. 28, 2025

(54) HEATING DEVICE

(71) Applicant: HAIER SMART HOME CO., LTD., Shandong (CN)

(72) Inventors: Haijuan Wang, Qingdao (CN); Peng Li, Qingdao (CN); Kunkun Zhao, Qingdao (CN)

(73) Assignee: HAIER SMART HOME CO., LTD., Qingdao (CN)

( * ) Notice: Subject to any disclaimer, the term of this patent is extended or adjusted under 35 U.S.C. 154(b) by 703 days.

(21) Appl. No.: 17/420,564

(22) PCT Filed: Jan. 3, 2020

(86) PCT No.: PCT/CN2020/070342
§ 371 (c)(1),
(2) Date: Jul. 2, 2021

(87) PCT Pub. No.: WO2020/140988
PCT Pub. Date: Jul. 9, 2020

(65) Prior Publication Data
US 2022/0117050 A1    Apr. 14, 2022

(30) Foreign Application Priority Data

Jan. 4, 2019   (CN) .......................... 201910009513.1

(51) Int. Cl.
*H05B 6/68*   (2006.01)
*A23L 3/00*   (2006.01)
(Continued)

(52) U.S. Cl.
CPC ................ *H05B 6/68* (2013.01); *A23L 3/001* (2013.01); *A23L 3/365* (2013.01); *H05B 6/72* (2013.01);
(Continued)

(58) Field of Classification Search
CPC .. A23L 3/001; H05B 6/46; H05B 6/72; H05B 6/62; H05B 6/68; H05B 6/688
See application file for complete search history.

(56) References Cited

U.S. PATENT DOCUMENTS 6,191,402 B1 * 2/2001 Ekemar ................. H05B 6/705
219/696
7,199,341 B2   4/2007 Kaneko et al.
(Continued)

FOREIGN PATENT DOCUMENTS

CN         1672467 A    9/2005
CN       105556212 A    5/2016
(Continued)

OTHER PUBLICATIONS

Supplementary European Search Report for EP Application No. 20736015.7 dated Feb. 2, 2022 (4 pages).
(Continued)

*Primary Examiner* — Thien S Tran
(74) *Attorney, Agent, or Firm* — ALSTON & BIRD LLP

(57) ABSTRACT

Disclosed are a heating device (100) and a refrigerator. The heating device (100) includes a cylinder body (110), a door body (120), an electromagnetic generating module (161) and a radiating antenna (150). A heating chamber (111) having a pick-and-place opening is defined in the cylinder body (110), and the heating chamber (111) is configured to place an object to be processed. The door body (120) is disposed at the pick-and-place opening and configured to open and close the pick-and-place opening. The electromagnetic generating module (161) is configured to generate an electromagnetic wave signal. The radiating antenna (150) is disposed in the cylinder body (110) and electrically connected with the electromagnetic generating module (161) to generate electromagnetic waves of a corresponding frequency according to the electromagnetic wave signal. Since the
(Continued)

peripheral edge of the radiating antenna (150) is formed by smooth curves, the distribution area of the electromagnetic waves in a plane parallel to the radiating antenna (150) may be increased, and the electromagnetic waves may be prevented from being too concentrated, thereby avoiding the problems of local overheating and uneven temperature of food.

10 Claims, 9 Drawing Sheets

(51) Int. Cl.
    *A23L 3/365* (2006.01)
    *F25D 23/12* (2006.01)
    *H05B 6/72* (2006.01)

(52) U.S. Cl.
    CPC .......... *A23V 2002/00* (2013.01); *F25D 23/12* (2013.01); *H05B 6/688* (2013.01)

(56) References Cited

U.S. PATENT DOCUMENTS

| | | | |
|---|---|---|---|
| 2006/0096979 A1 | 5/2006 | Kaneko et al. | |
| 2012/0152939 A1 | 6/2012 | Nobue et al. | |
| 2018/0042074 A1* | 2/2018 | Qiu | H05B 6/705 |

FOREIGN PATENT DOCUMENTS

| | | | |
|---|---|---|---|
| CN | 209897304 U | | 1/2020 |
| JP | 0738711 U | | 7/1995 |
| JP | 2001250672 A | * | 9/2001 |
| JP | 2007118966 A | * | 5/2007 |
| JP | 2009-170335 A | | 7/2009 |
| JP | 2017211106 A | | 11/2017 |
| JP | 2018088363 A | | 6/2018 |
| RU | 2289219 C2 | | 12/2006 |
| WO | WO 2011/118198 A1 | | 9/2011 |
| WO | WO 2015/020008 A1 | | 2/2015 |

OTHER PUBLICATIONS

Search Report for Russian Application No. 2021122165 dated Mar. 17, 2022 (4 pages).
1$^{st}$ Office Action for Russian Application No. 2021122165 dated Mar. 17, 2022 (7 pages).
1$^{st}$ Office Action for India Application No. 202137032872 dated Mar. 24, 2022 (7 pages).
1$^{st}$ Office Action for EP Application No. 20736015.7 dated Mar. 4, 2022 (8 pages).
1$^{st}$ Office Action for Australia Application No. 2020204763 dated May 18, 2022 (3 pages).
International Search Report for PCT/CN2020/070342 (ISA/CN) mailed Apr. 1, 2020 (6 pages).

* cited by examiner

HEATING DEVICE

TECHNICAL FIELD

The present invention relates to kitchen appliances, and particularly relates to an electromagnetic wave heating device.

BACKGROUND ART

In the freezing process of food, the quality of the food is maintained, but the frozen food needs to be thawed before processing or eating. In order to facilitate users freezing and thawing the food, in the prior art, the food is generally thawed by an electromagnetic wave device.

The temperature uniformity of the thawed food is closely related to the distribution uniformity of electromagnetic waves in a heating chamber. When there is a gap between a radiating antenna and the inner walls of the heating chamber in the circumferential direction of the radiating antenna, the electromagnetic waves in the heating chamber will be concentrated at the peripheral edge of the radiating antenna due to the edge effect of the radiating antenna. By comprehensive consideration, an electromagnetic wave heating device with uniform distribution of electromagnetic waves is required in design.

SUMMARY OF THE INVENTION

An objective of the present invention is to provide a heating device with uniform distribution of electromagnetic waves.

A further objective of the present invention is to improve the assembly efficiency of the heating device.

Another further objective of the present invention is to improve the heating efficiency.

Specifically, the present invention provides a heating device, including:

a cylinder body, in which a heating chamber having a pick-and-place opening is defined, and the heating chamber is configured to place an object to be processed;

a door body, disposed at the pick-and-place opening and configured to open and close the pick-and-place opening;

an electromagnetic generating module, configured to generate an electromagnetic wave signal; and a radiating antenna, disposed in the cylinder body and electrically connected with the electromagnetic generating module to generate electromagnetic waves of a corresponding frequency according to the electromagnetic wave signal, wherein a peripheral edge of the radiating antenna is formed by smooth curves, so as to make a distribution of the electromagnetic waves in the heating chamber more uniform.

Optionally, a geometric center of the radiating antenna coincides with a center of a cross section of the heating chamber taken along an installation plane of the radiating antenna.

Optionally, the radiating antenna is in a shape of a perfect circle.

Optionally, a radius of the radiating antenna is $5/13$ to $13/20$ of a shortest distance from a peripheral edge of the cross section to the center thereof.

Optionally, the cross section is rectangular or oblong; and the radiating antenna is in a shape of an oblong, and a length direction of the radiating antenna is parallel to a length direction of the cross section.

Optionally, a length of the radiating antenna is $9/20$ to $7/10$ of a length of the cross section;

a width of the radiating antenna is $3/10$ to $13/20$ of a width of the cross section; and a fillet of the radiating antenna is $2/7$ to $1/2$ of the width of the radiating antenna.

Optionally, the cylinder body is made of a metal; and the radiating antenna is horizontally disposed at a height of $1/3$ to $1/2$ of the cylinder body.

Optionally, the heating device further includes:

an antenna housing, made of an insulating material and configured to separate an inner space of the cylinder body into the heating chamber and an electrical appliance chamber, wherein the radiating antenna is disposed in the electrical appliance chamber and is fixedly connected with the antenna housing.

Optionally, the radiating antenna is provided with a plurality of engaging holes; and the antenna housing is correspondingly provided with a plurality of buckles, and the plurality of buckles are configured to respectively pass through the plurality of engaging holes to be engaged with the radiating antenna, wherein each of the buckles is composed of two barbs disposed at an interval and in mirror symmetry; or each of the buckles is composed of a fixing part perpendicular to the radiating antenna and having a hollow middle part, and an elastic part extending inclining to the fixing part from an inner end edge of the fixing part and toward the radiating antenna.

Optionally, the heating device further includes:

a signal processing and measurement and control circuit, disposed in the electrical appliance chamber, including:

a detection unit, connected in series between the electromagnetic generating module and the radiating antenna, and configured to detect specific parameters of an incident wave signal and a reflected wave signal passing through the detection unit;

a control unit, configured to calculate an electromagnetic wave absorption rate of the object to be processed according to the specific parameters; and a matching unit, connected in series between the electromagnetic generating module and the radiating antenna, and configured to adjust a load impedance of the electromagnetic generating module according to the electromagnetic wave absorption rate.

Since the peripheral edge of the radiating antenna of the present invention is formed by smooth curves, the distribution area of the electromagnetic waves in a plane parallel to the radiating antenna may be increased, and the electromagnetic waves may be prevented from being too concentrated, thereby avoiding the problems of local overheating and uneven temperature of food.

Further, in the heating device of the present invention, the radiating antenna is covered and fixed through the antenna housing, which not only can separate the object to be processed from the radiating antenna to prevent the radiating antenna from being dirty or damaged by accidental touch, but also can simplify the assembly process of the heating device to facilitate the positioning and installation of the radiating antenna.

Further, in the present invention, the antenna housing is disposed at the height of $1/3$ to $1/2$ of the cylinder body, which not only can avoid the damage to the antenna housing and the radiating antenna due to the fact that a user places an object to be processed with an excessive height, but also can make the electromagnetic waves in the heating chamber have a relatively high energy density, so that the object to be processed is quickly heated.

Further, in the present invention, the load impedance of the electromagnetic generating module is adjusted by the matching unit so as to improve a matching degree between the output impedance and the load impedance of the electromagnetic generating module, so that when foods with different fixed attributes (such as type, weight and volume) are placed in the heating chamber, or during the temperature change of the foods, relatively more electromagnetic wave energy is radiated in the heating chamber.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numerals in the drawings indicate the same or similar components or parts. Those skilled in the art should understand that these drawings are not necessarily drawn in scale. In figures.

DETAILED DESCRIPTION OF THE INVENTION

Figure 1:
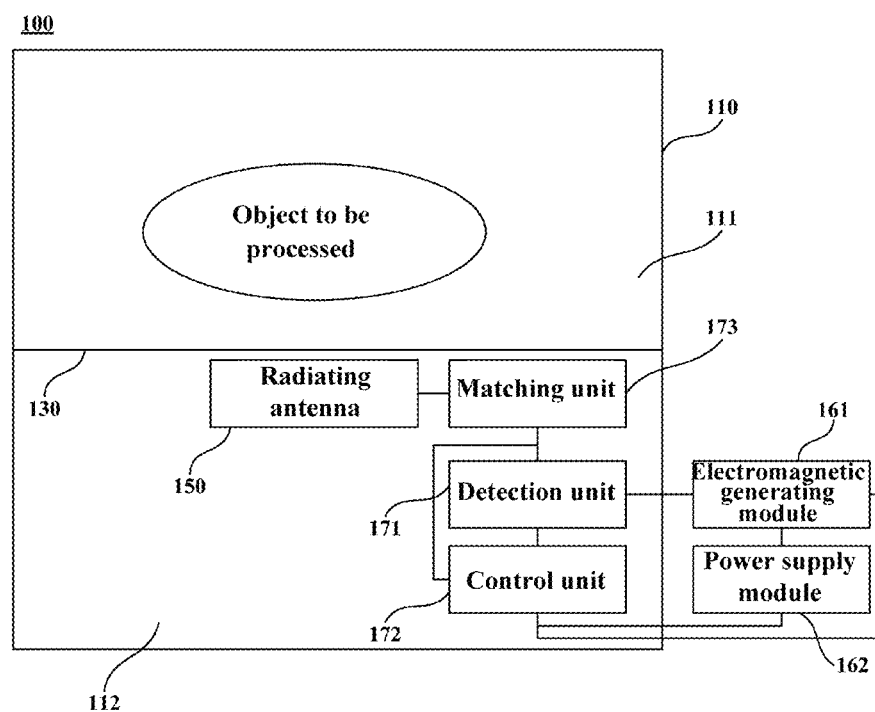
FIG. 1 is a schematic structural view of a heating device according to one embodiment of the present invention.
Figure 2:
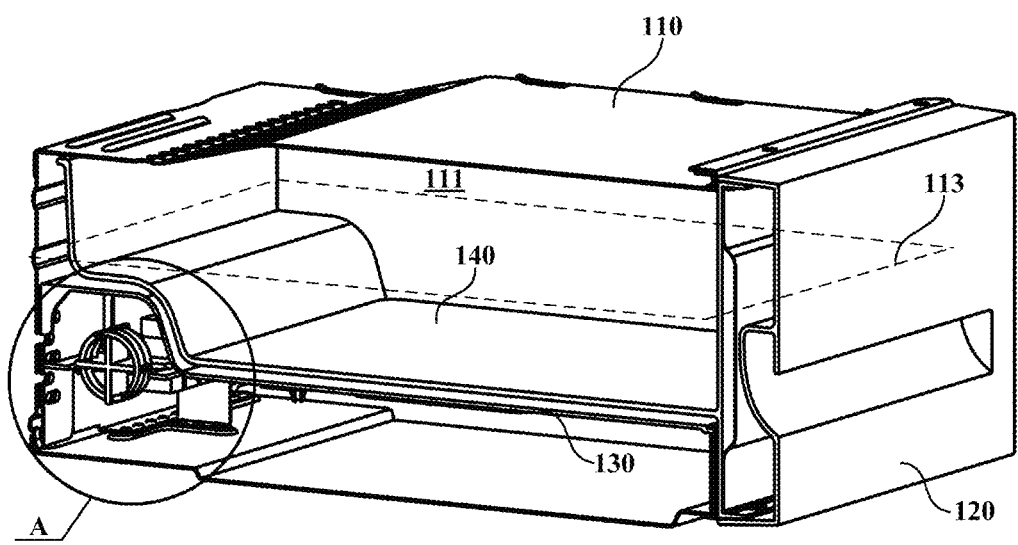
FIG. 2 is a schematic cross-sectional view of the heating device as shown in FIG. 1, wherein an electromagnetic generating module and a power supply module are omitted.

FIG. 1 is a schematic structural view of a heating device 100 according to one embodiment of the present invention. FIG. 2 is a schematic cross-sectional view of the heating device 100 as shown in FIG. 1, wherein an electromagnetic generating module 161 and a power supply module 162 are omitted. Referring to FIG. 1 and FIG. 2, the heating device 100 may include a cylinder body 110, a door body 120, an electromagnetic generating module 161, a power supply module 162 and a radiating antenna 150.

A heating chamber 111 having a pick-and-place opening is defined in the cylinder body 110, and the heating chamber 111 is configured to place an object to be processed. The pick-and-place opening may be formed in the front wall or the top wall of the heating chamber 111 so as to pick and place the object to be processed.

The door body 120 may be installed together with the cylinder body 110 by an appropriate method, such as a sliding rail connection, a hinged connection, etc., and is configured to open and close the pick-and-place opening. In an illustrated embodiment, the heating device 100 also includes a drawer 140 for carrying the object to be processed; a front end plate of the drawer 140 is configured to be fixedly connected with the door body 120, and two lateral side plates of the drawer are movably connected with the cylinder body 110 by sliding rails.

The power supply module 162 may be configured to be electrically connected with the electromagnetic generating module 161 to provide electric energy to the electromagnetic generating module 161, so that the electromagnetic generating module 161 generates electromagnetic wave signals. The radiating antenna 150 may be disposed in the cylinder body 110 and is electrically connected with the electromagnetic generating module 161 to generate electromagnetic waves of corresponding frequencies according to the electromagnetic wave signals, so as to heat the object to be processed in the cylinder body 110.

In some embodiments, the cylinder body 110 and the door body 120 may be respectively provided with electromagnetic shielding features, so that the door body 120 is conductively connected with the cylinder body 110 when the door body is in a closed state, so as to prevent electromagnetic leakage.

In some embodiments, the cylinder body 110 may be made of metals to serve as a receiving pole to receive electromagnetic waves generated by the radiating antenna 150. In some other embodiments, a receiving pole plate may be disposed on the top wall of the cylinder body 110 to receive electromagnetic waves generated by the radiating antenna 150.

Figure 4:
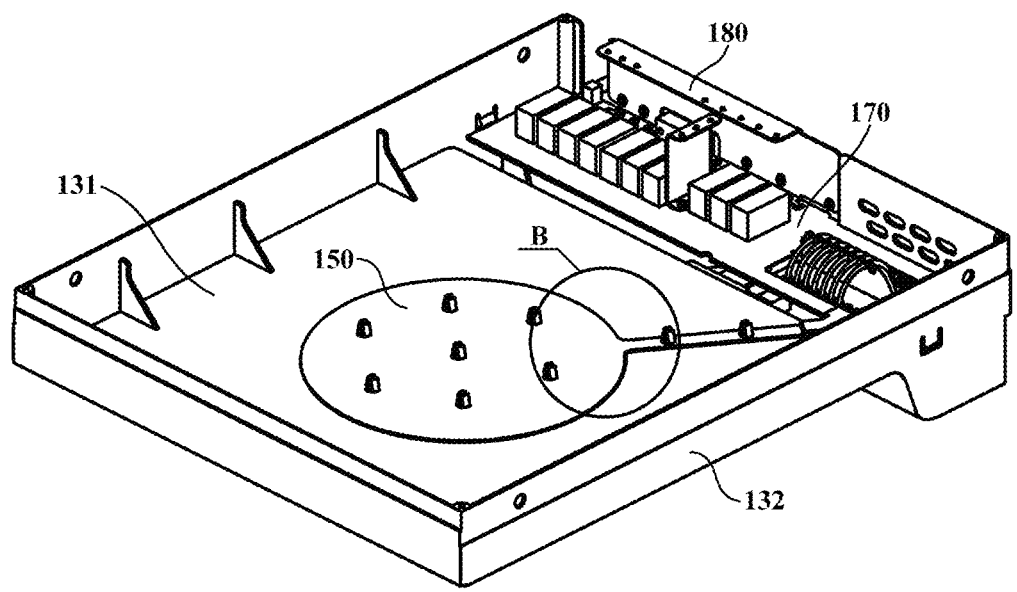
FIG. 4 is a schematic structural view of an electrical appliance chamber according to one embodiment of the present invention.
Figure 6:
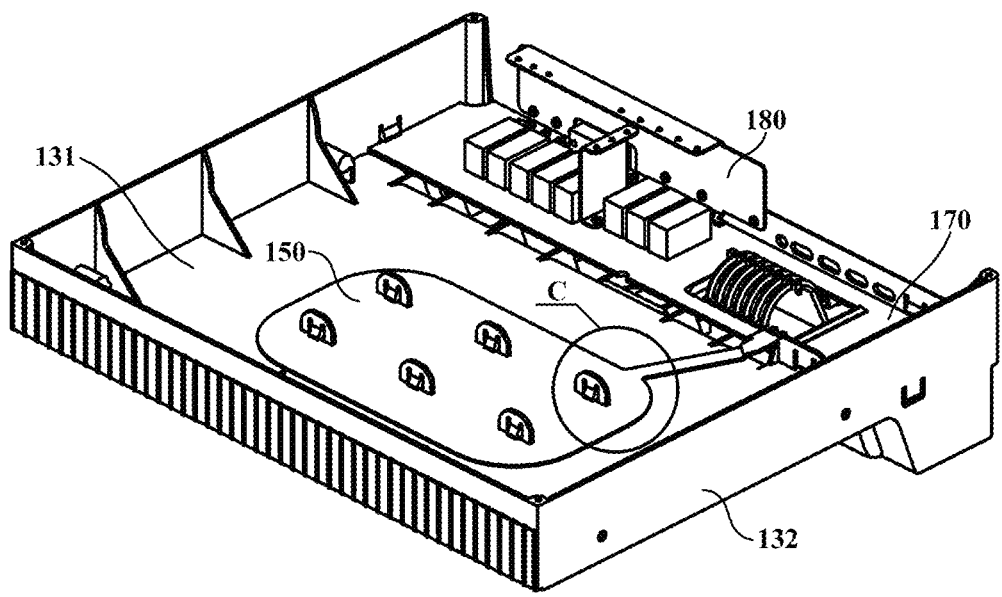
FIG. 6 is a schematic structural view of an electrical appliance chamber according to another embodiment of the present invention.

FIG. 4 is a schematic structural view of an electrical appliance chamber 112 according to one embodiment of the present invention. FIG. 6 is a schematic structural view of the electrical appliance chamber 112 according to another embodiment of the present invention. Referring to FIG. 4 and FIG. 6, the peripheral edge of the radiating antenna 150 may be formed by smooth curves, so as to make the distribution of electromagnetic waves in the cylinder body 110 more uniform, thereby improving the temperature uniformity of the object to be processed. A smooth curve refers to a curve of which the first derivative of the curve equation is continuous, which means that the peripheral edge of the radiating antenna 150 has no sharp corner in engineering.

Figure 8:
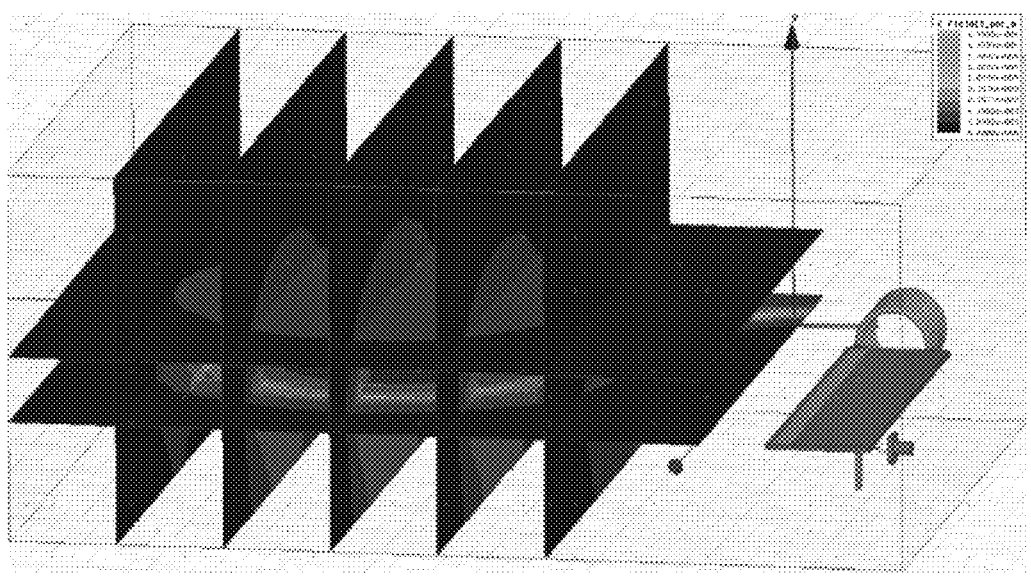
FIG. 8 is a simulated view of a three-dimensional magnetic field of the radiating antenna in FIG. 4.

FIG. 8 is a simulated view of a three-dimensional magnetic field of the radiating antenna in FIG. 4. FIG. 10 is a comparative view of color and electric field intensity in FIG. 8 and FIG. 9, wherein E field refers to the electric field intensity, and the unit thereof is Volt/meter (V_per_m). It can be seen from FIG. 8 and FIG. 10 that when the peripheral edge of the radiating antenna is formed by smooth curves, the distribution of the electromagnetic waves above the radiating antenna (in the heating chamber 111) is relatively uniform; not only do the electromagnetic waves have a relatively large distribution range in the horizontal direction, but also the electromagnetic waves are uniformly distributed and have basically equal magnetic field intensity.

Figure 9:
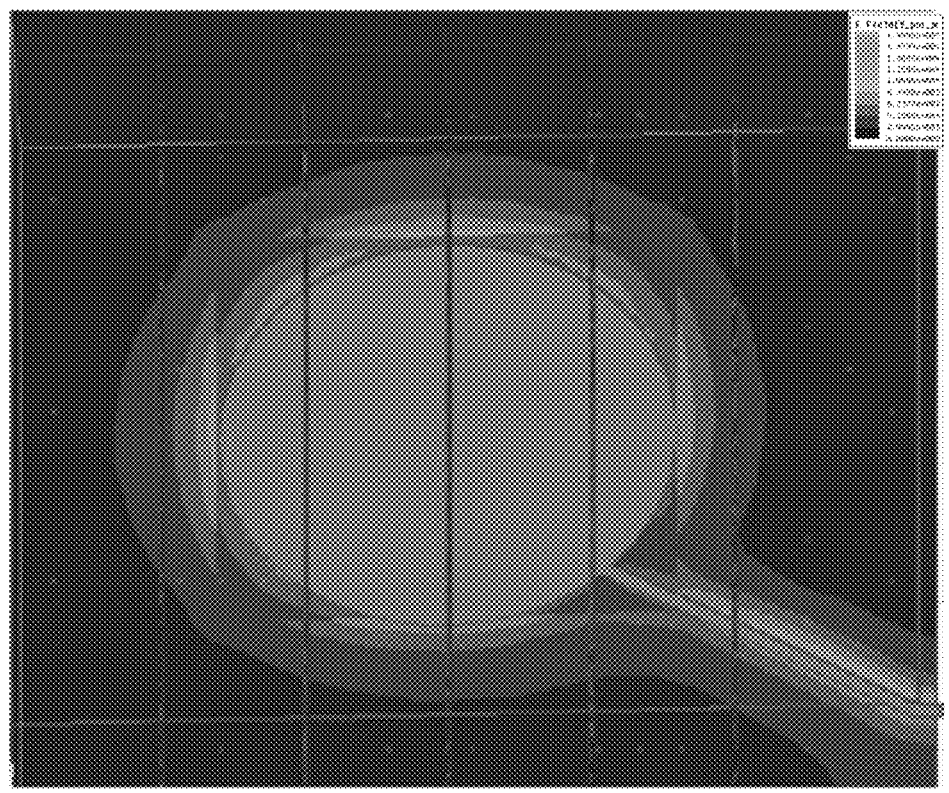
FIG. 9 is a simulated view of a two-dimensional magnetic field of the radiating antenna in FIG. 8 in a plane where the radiating antenna is located.
Figure 10:
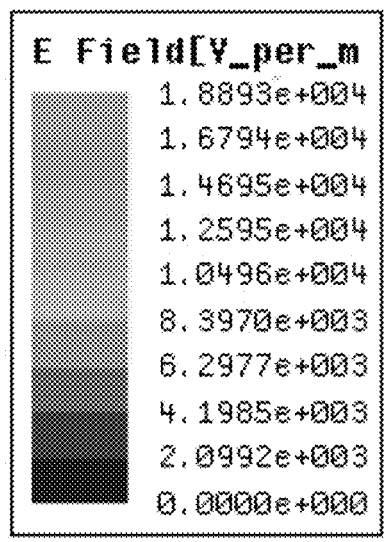
FIG. 10 is a comparative view of color and electric field intensity in FIG. 8 and FIG. 9.

FIG. 9 is a simulated view of a two-dimensional magnetic field of the radiating antenna in FIG. 8 in a plane where the radiating antenna is located. It can be seen from FIG. 9 and FIG. 10 that when the peripheral edge of the radiating antenna is formed by smooth curves, the area of the region in which electromagnetic waves are relatively concentrated in the plane where the radiating antenna is located is relatively small, and the distribution of the electromagnetic waves at the peripheral edge of the radiating antenna is relatively uniform, so that the phenomenon of local heating or even ignition is avoided.

Referring to FIG. 2, the geometric center of the radiating antenna 150 coincides with the center of a maximum cross section 113 of the heating chamber 111 taken along an imaginary plane parallel to an installation plane of the radiating antenna 150, thereby further improving the distribution uniformity of the electromagnetic waves in the heating chamber 111.

Figure 5A:
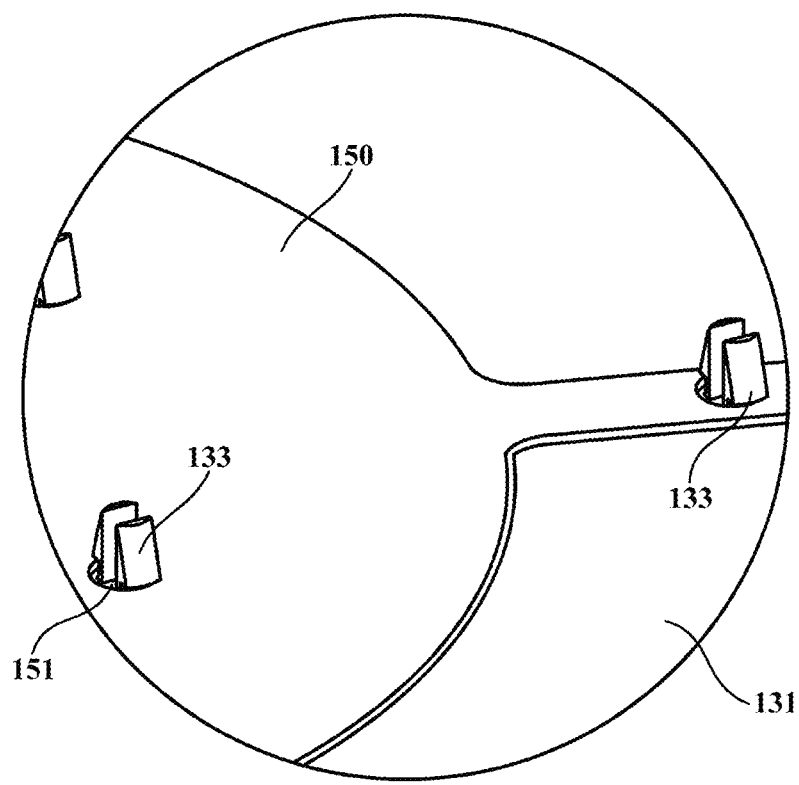
FIG. 5a is a schematic enlarged view of a region B in FIG. 4.
Figure 5B:
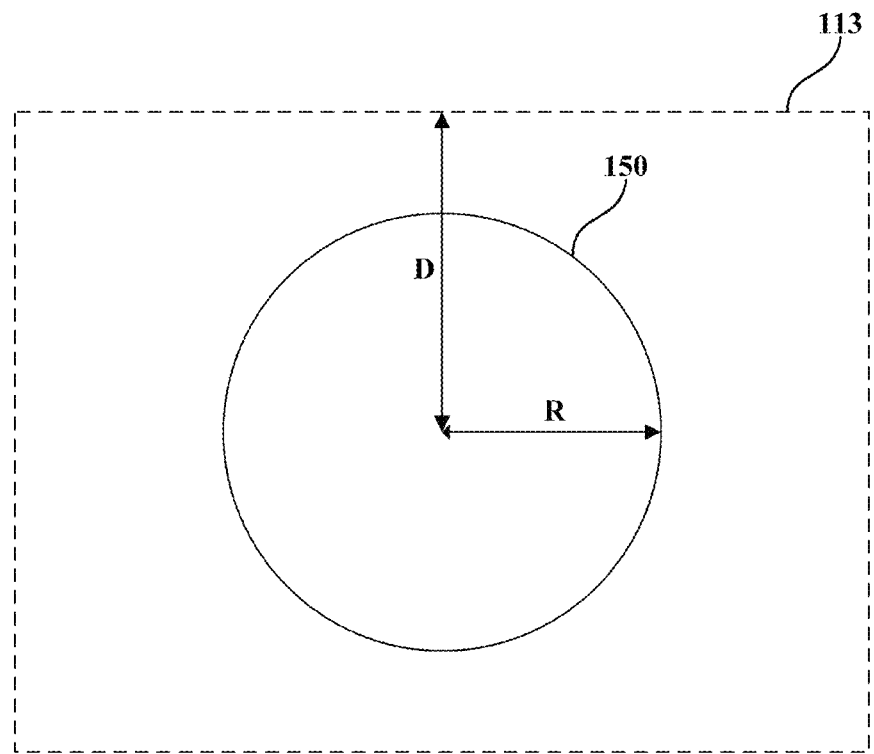
FIG. 5b is a schematic view of a radiating antenna according to one embodiment of the present invention.

In some embodiments, referring to FIG. 5b, the radiating antenna 150 may be in the shape of a perfect circle. In the present embodiment, the radius R of the radiating antenna 150 is $5/13$ to $13/20$, such as $5/13$, $16/31$ or $13/20$, of the shortest distance D from the peripheral edge of the above-mentioned cross section to the center thereof, so that the antenna material is saved, and meanwhile, the electromagnetic waves in the heating chamber 111 have a relatively large distribution area, a relatively uniform distribution and a relatively high energy density.

Figure 7A:
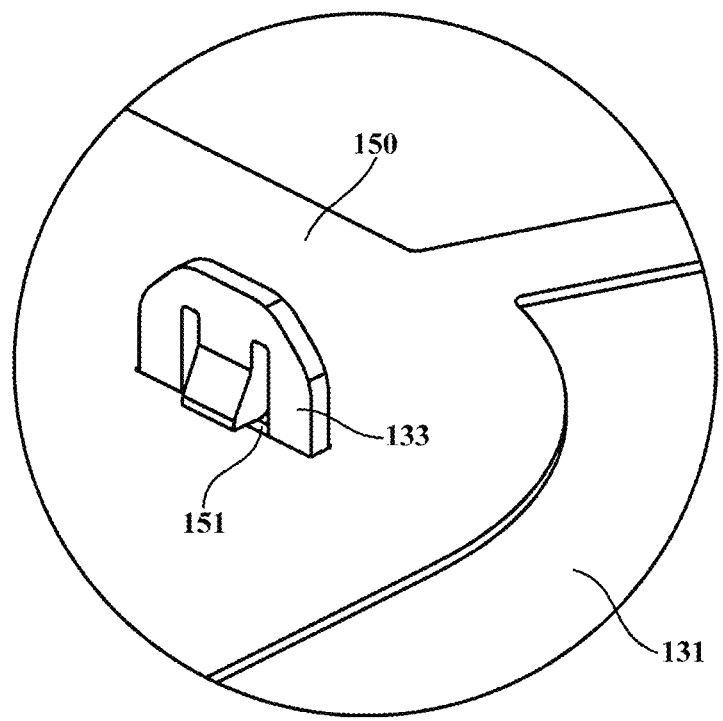
FIG. 7a is a schematic enlarged view of a region C in FIG. 6.
Figure 7B:
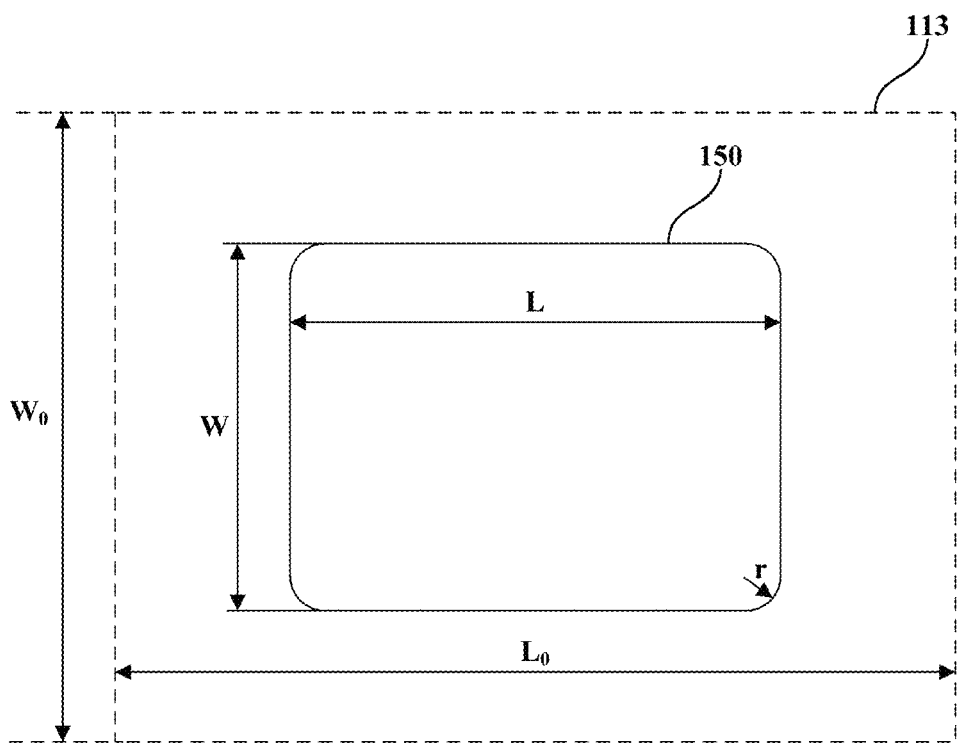
FIG. 7b is a schematic view of a radiating antenna according to another embodiment of the present invention.

In some other embodiments, referring to FIG. 7b, when the cross section of the heating chamber 111 taken along the installation plane of the radiating antenna 150 is rectangular or oblong, the radiating antenna 150 may be in the shape of an oblong. As used herein, "oblong" refers to a rectangle having rounded corners, which may be referenced interchangeably herein as a "corner-rounded rectangle." The length direction of the radiating antenna 150 may be parallel to the length direction of the above-mentioned cross section, so that the distribution of the electromagnetic waves in the heating chamber 111 is uniform.

In an embodiment in which the radiating antenna 150 is in the shape of an oblong, the length L of the radiating antenna 150 may be $9/20$ to $7/10$, such as $9/20$, $4/7$ or $7/10$ of the length $L_0$ of the above-mentioned cross section; the width W of the radiating antenna 150 may be $3/10$ to $13/20$, such as $3/10$, $11/23$ or $13/20$, of the width $W_0$ of the above-mentioned cross section; and the size of the fillet of the radiating antenna 150 (represented by the radius r of the arc forming the fillet) is $2/7$ to $1/2$, such as $2/7$, $1/3$, $2/5$ or $1/2$, of the width of the radiating antenna 150. Therefore, the antenna material is saved, and meanwhile, the electromagnetic waves in the heating chamber 111 have a relatively large distribution area, a relatively uniform distribution and a relatively high energy density.

Referring to FIG. 2 and FIG. 4, the heating device 100 may further include an antenna housing 130 to separate the inner space of the cylinder body 110 into a heating chamber 111 and an electrical appliance chamber 112. The object to be processed and the radiating antenna 150 may be respectively disposed in the heating chamber 111 and the electrical appliance chamber 112 to separate the object to be processed from the radiating antenna 150, so as to prevent the radiating antenna 150 from being dirty or damaged by accidental touch.

In some embodiments, the antenna housing 130 may be made of an insulating material, so that the electromagnetic waves generated by the radiating antenna 150 may pass through the antenna housing 130 to heat the object to be processed. Further, the antenna housing 130 may be made of a non-transparent material to reduce the electromagnetic loss of electromagnetic waves at the antenna housing 130, thereby increasing the heating rate of the object to be processed. The above-mentioned non-transparent material is a translucent material or an opaque material. The non-transparent material may be a PP material, a PC material or an ABS material.

The antenna housing 130 may also be configured to fix the radiating antenna 150 to simplify the assembly process of the heating device 100 and facilitate the positioning and installation of the radiating antenna 150. Specifically, the antenna housing 130 may include a clapboard 131 for separating the heating chamber 111 and the electrical appliance chamber 112, and a skirt part 132 fixedly connected with the inner wall of the cylinder body 110, wherein the radiating antenna 150 may be configured to be fixedly connected with the clapboard 131.

In some embodiments, the radiating antenna 150 may be configured to be engaged with the antenna housing 130. FIG. 5a is a schematic enlarged view of a region B in FIG. 4. Referring to FIG. 5a, the radiating antenna 150 may be provided with a plurality of engaging holes 151; the antenna housing 130 may be correspondingly provided with a plurality of buckles 133; and the plurality of buckles 133 are configured to respectively pass through the plurality of engaging holes 151 to be engaged with the radiating antenna 150.

In one embodiment of the present invention, each of the buckles 133 may be composed of two barbs disposed at an interval and in mirror symmetry.

FIG. 7a is a schematic enlarged view of a region C in FIG. 6. Referring to FIG. 7a, in another embodiment of the present invention, each of the buckles 133 may be composed of a fixing part perpendicular to the radiating antenna 150 and having a hollow middle part, and an elastic part extending inclining to the fixing part from the inner end edge of the fixing part and toward the antenna.

In some other embodiments, the radiating antenna 150 may be configured to be fixed to the antenna housing 130 through an electroplating process.

The antenna housing 130 may further include a plurality of reinforcing ribs, and the reinforcing ribs are configured to connect the clapboard 131 and the skirt part 132 so as to improve the structural strength of the antenna housing 130.

In some embodiments, the antenna housing 130 may be disposed at the bottom of the cylinder body 110 to avoid the damage to the antenna housing 130 due to the fact that a user places an object to be processed with an excessive height. The radiating antenna 150 may be horizontally fixed on the lower surface of the clapboard 131.

The radiating antenna 150 may be disposed at the height of $1/3$ to $1/2$, such as $1/3$, $2/5$ or $1/2$, of the cylinder body 110, so that the volume of the heating chamber 111 is relatively large, and meanwhile, the electromagnetic waves in the heating chamber 111 have a relatively high energy density so as to make the object to be processed heated quickly.

Figure 3:
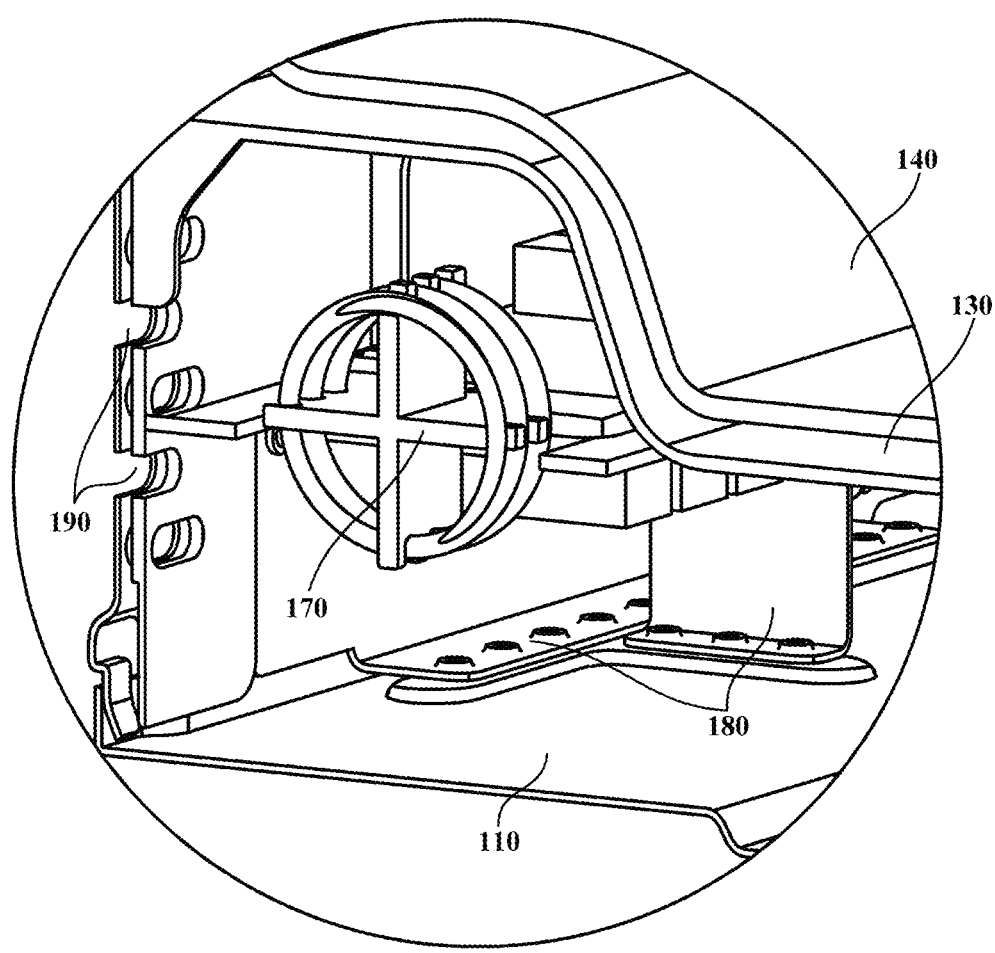
FIG. 3 is a schematic enlarged view of a region A in FIG. 2.

FIG. 3 is a schematic enlarged view of a region A in FIG. 2. Referring to FIG. 1 to FIG. 3, the heating device 100 may further include a signal processing and measurement and control circuit 170. Specifically, the signal processing and measurement and control circuit 170 may include a detection unit 171, a control unit 172 and a matching unit 173.

The detection unit 171 may be connected in series between the electromagnetic generating module 161 and the radiating antenna 150, and is configured to detect in real time the specific parameters of incident wave signals and reflected wave signals passing through the detection unit.

The control unit 172 may be configured to acquire the specific parameters from the detection unit 171, and calculate the power of incident waves and reflected waves according to the specific parameters. In the present invention, the specific parameters may be voltage values and/or current values. Alternatively, the detection unit 171 may be a power meter to directly measure the power of incident waves and reflected waves.

The control unit 172 may further calculate an electromagnetic wave absorption rate of the object to be processed according to the power of incident waves and reflected waves, compare the electromagnetic wave absorption rate with a preset absorption threshold, and send an adjusting command to the matching unit 173 when the electromagnetic wave absorption rate is less than the preset absorption threshold. The preset absorption threshold may be 60% to 80%, such as 60%, 70% or 80%.

The matching unit 173 may be connected in series between the electromagnetic generating module 161 and the radiating antenna 150, and is configured to adjust a load impedance of the electromagnetic generating module 161 according to an adjusting command of the control unit 172, so as to improve the matching degree between the output impedance and the load impedance of the electromagnetic generating module 161, so that when foods with different fixed attributes (such as type, weight and volume) are placed in the heating chamber 111, or during the temperature change of the foods, relatively more electromagnetic wave energy is radiated in the heating chamber 111, thereby increasing the heating rate.

In some embodiments, the heating device 100 may be used for thawing. The control unit 172 may also be configured to calculate an imaginary part change rate of a dielectric coefficient of the object to be processed according to the power of incident waves and reflected waves, compare the imaginary part change rate with a preset change threshold, and send a stop command to the electromagnetic generating module 161 when the imaginary part change rate of the dielectric coefficient of the object to be processed is greater than or equal to the preset change threshold, so that the electromagnetic generating module 161 stops working, and the thawing program is terminated.

The preset change threshold may be obtained by testing the imaginary part change rate of the dielectric coefficient of foods with different fixed attributes at −3° C. to 0° C., so that the foods have good shear strength. For example, when the object to be processed is raw beef, the preset change threshold may be set to 2.

The control unit 172 may also be configured to receive a user command and control the electromagnetic generating module 161 to start working according to the user command, wherein the control unit 172 is configured to be electrically connected with the power supply module 162 to obtain electric energy from the power supply module 162 and to be always in a standby state.

In some embodiments, the signal processing and measurement and control circuit 170 may be integrated on a circuit board and horizontally disposed in the electrical appliance chamber 112 to facilitate the electrical connection between the radiating antenna 150 and a matching module.

The antenna housing 130 and the cylinder body 110 may be provided with heat dissipation holes 190 respectively in positions corresponding to the matching unit 173, so that the heat generated by the matching unit 173 during working is discharged through the heat dissipation holes 190. In some embodiments, the signal processing and measurement and control circuit 170 may be disposed on the rear side of the radiating antenna 150. The heat dissipation holes 190 may be formed in the rear walls of the antenna housing 130 and the cylinder body 110.

In some embodiments, the metal cylinder body 110 may be configured to be grounded to discharge the electric charges thereon, thereby improving the safety of the heating device 100.

The heating device 100 may further include a metal bracket 180. The metal bracket 180 may be configured to connect the circuit board and the cylinder body 110 to support the circuit board and discharge the electric charges on the circuit board through the cylinder body 110. In some embodiments, the metal bracket 180 may be composed of two parts perpendicular to each other.

In some embodiments, the electromagnetic generating module 161 and the power supply module 162 may be disposed on the outer side of the cylinder body 110. A part of the metal bracket 180 may be disposed at the rear part of the circuit board and extend vertically along a lateral direction, and may be provided with two wiring ports, so that the wiring terminal of the detection unit 171 (or the matching unit 173) extends out from one wiring port and is electrically connected with the electromagnetic generating module 161, and the wiring terminal of the control unit 172 extends out from the other wiring port and is electrically connected with the electromagnetic generating module 161 and the power supply module 162.

In some embodiments, the heating device 100 may be disposed in a storage compartment of a refrigerator to facilitate users thawing the food.

Hereto, those skilled in the art should realize that although multiple exemplary embodiments of the present invention have been shown and described in detail herein, without departing from the spirit and scope of the present invention, many other variations or modifications that conform to the principles of the present invention may still be directly determined or deduced from the contents disclosed in the present invention. Therefore, the scope of the present invention should be understood and recognized as covering all these other variations or modifications.

The invention claimed is:

1. A heating device, comprising:
    a cylinder body, in which a heating chamber having a pick-and-place opening is defined, and the heating chamber is configured to place an object to be processed;
    a door body, disposed at the pick-and-place opening and configured to open and close the pick-and-place opening;
    an electromagnetic generating module, configured to generate an electromagnetic wave signal; and
    a radiating antenna, disposed in the cylinder body and electrically connected with the electromagnetic generating module to generate electromagnetic waves of a corresponding frequency according to the electromagnetic wave signal, wherein:
        a peripheral edge of the radiating antenna is formed by smooth curves, so as to make a distribution of the electromagnetic waves in the heating chamber more uniform;
        a geometric center of the radiating antenna coincides with a center of a maximum cross section of the heating chamber taken along an imaginary plane parallel to an installation plane of the radiating antenna;

a shape of the cross section of the heating chamber is rectangular or a corner-rounded rectangle;
a shape of the radiating antenna is a corner-rounded rectangle;
a length direction of the radiating antenna is parallel to a length direction of the cross section of the heating chamber; and
the radiating antenna has at least one of the following dimensional criteria: i) a length of the radiating antenna is 9/20 to 7/10 of a length of the cross section, ii) a width of the radiating antenna is 3/10 to 13/20 of a width of the cross section, and iii) a fillet of the radiating antenna is 2/7 to 1/2 of the width of the radiating antenna.

2. The heating device of claim 1, wherein
a shape of the cross section of the heating chamber is a corner-rounded rectangle.

3. The heating device according to claim 1, wherein:
the cylinder body is made of a metal; and
the radiating antenna is horizontally disposed at a height of 1/3 to 1/2 of the cylinder body.

4. The heating device according to claim 1, further comprising:
an antenna housing, made of an insulating material and configured to separate an inner space of the cylinder body into the heating chamber and an electrical appliance chamber, wherein the radiating antenna is disposed in the electrical appliance chamber and is horizontally fixed on the lower surface of the antenna housing.

5. The heating device according to claim 4, wherein:
the radiating antenna is provided with a plurality of engaging holes; and
the antenna housing is correspondingly provided with a plurality of buckles, and the plurality of buckles are configured to respectively pass through the plurality of engaging holes to be engaged with the radiating antenna, wherein:
each of the buckles is composed of two barbs disposed at an interval and in mirror symmetry; or
each of the buckles is composed of a fixing part perpendicular to the radiating antenna and having a hollow middle part, and an elastic part extending inclining to the fixing part from an inner end edge of the fixing part and toward the radiating antenna.

6. The heating device according to claim 4, further comprising:
a signal processing and measurement and control circuit, disposed in the electrical appliance chamber, comprising:
a detection unit, connected in series between the electromagnetic generating module and the radiating antenna, and configured to detect specific parameters of an incident wave signal and a reflected wave signal passing through the detection unit;
a control unit, configured to calculate an electromagnetic wave absorption rate of the object to be processed according to the specific parameters; and
a matching unit, connected in series between the electromagnetic generating module and the radiating antenna, and configured to adjust a load impedance of the electromagnetic generating module according to the electromagnetic wave absorption rate.

7. The heating device according claim 4, wherein the cylinder body is made of a metal and grounded.

8. The heating device according to claim 7, further comprising:
a signal processing and measurement and control circuit, integrated on a circuit board and horizontally disposed in the electrical appliance chamber; and
a metal bracket, configured to connect the circuit board with the cylinder body, and to support the circuit board and discharge electric charges on the circuit board through the cylinder body.

9. The heating device according to claim 4, wherein the antenna housing comprises:
a clapboard, configured to separate the heating chamber and the electrical appliance chamber;
a skirt part, fixedly connected with an inner wall of the cylinder body; and
a plurality of reinforcing ribs, configured to connect the clapboard and the skirt part, wherein the radiating antenna is horizontally fixed on the lower surface of the clapboard.

10. A heating device, comprising:
a cylinder body, in which a heating chamber having a pick-and-place opening is defined, and the heating chamber is configured to place an object to be processed;
a door body, disposed at the pick-and-place opening and configured to open and close the pick-and-place opening;
an electromagnetic generating module, configured to generate an electromagnetic wave signal; and
a radiating antenna, disposed in the cylinder body and electrically connected with the electromagnetic generating module to generate electromagnetic waves of a corresponding frequency according to the electromagnetic wave signal, wherein:
a peripheral edge of the radiating antenna is formed by smooth curves, so as to make a distribution of the electromagnetic waves in the heating chamber more uniform;
a geometric center of the radiating antenna coincides with a center of a maximum cross section of the heating chamber taken along an imaginary plane parallel to an installation plane of the radiating antenna;
a shape of the cross section of the heating chamber is rectangular or a corner-rounded rectangle;
a shape of the radiating antenna is a corner-rounded rectangle; and
a length direction of the radiating antenna is parallel to a length direction of the cross section of the heating chamber.

* * * * *

UNITED STATES PATENT AND TRADEMARK OFFICE
CERTIFICATE OF CORRECTION

PATENT NO. : 12,213,236 B2  
APPLICATION NO. : 17/420564  
DATED : January 28, 2025  
INVENTOR(S) : Haijuan Wang et al.

Page 1 of 1

It is certified that error appears in the above-identified patent and that said Letters Patent is hereby corrected as shown below:

On the Title Page

At Item (71), Applicant, Line 2, delete "Shandong" and insert -- Qingdao --, therefor.

In the Claims

In Column 10, Line 6, Claim 7, delete "according claim" and insert -- according to claim --, therefor.

Signed and Sealed this  
Thirteenth Day of May, 2025

Coke Morgan Stewart  
*Acting Director of the United States Patent and Trademark Office*